(12) United States Patent
Donnerdal et al.

(10) Patent No.: US 7,740,012 B2
(45) Date of Patent: Jun. 22, 2010

(54) WORKING TOOL AND MACHINE FOR SAWING AND CUTTING

(75) Inventors: Ove Donnerdal, Savedalen (SE); Stigbjorn Juhojuntti, Bohus (SE); Joe Baillargeon, Orlando, FL (US)

(73) Assignee: Husqvarna AB, Stockholm (SE)

( * ) Notice: Subject to any disclaimer, the term of this patent is extended or adjusted under 35 U.S.C. 154(b) by 435 days.

(21) Appl. No.: 11/589,552

(22) Filed: Oct. 30, 2006

(65) Prior Publication Data
US 2007/0261254 A1    Nov. 15, 2007

Related U.S. Application Data

(63) Continuation-in-part of application No. PCT/SE2004/000663, filed on Apr. 30, 2004.

(51) Int. Cl.
*B23D 45/16* (2006.01)
*B27B 5/14* (2006.01)

(52) U.S. Cl. .................. 125/13.01; 30/276; 30/389

(58) Field of Classification Search .............. 30/389, 30/276, 347; 83/106, 676; 125/13.01; 451/359
See application file for complete search history.

(56) References Cited

U.S. PATENT DOCUMENTS

| | | | |
|---|---|---|---|
| 2,972,363 A | 2/1961 | Santilli | |
| 3,835,901 A | 9/1974 | Jonsson | |
| 3,930,310 A | 1/1976 | Santilli | |
| 4,472,880 A * | 9/1984 | Johansson | 30/389 |
| 4,646,607 A | 3/1987 | Johansson | |
| 4,793,065 A | 12/1988 | Johansson | |
| 5,038,474 A * | 8/1991 | Larsson et al. | 30/123.3 |
| 6,336,273 B1 | 1/2002 | Nilsson et al. | |
| 6,374,501 B1 | 4/2002 | Claesson | |

FOREIGN PATENT DOCUMENTS

CH    83163    11/1919

* cited by examiner

*Primary Examiner*—Timothy V Eley
(74) *Attorney, Agent, or Firm*—Pearne & Gordon LLP (57) ABSTRACT

Working tool and machine for sawing or cutting, comprising an annular blade (2) intended to be rotated about an axis of rotation, encircling the axis of rotation, the annular blade comprising an annular blank (3; 3') and means (15), e.g. diamond segments (15), forming the working part of the tool and provided in connection to an outer edge (31) of the blank (3; 3'), the blade and blank also having an inner edge (19), an inner edge portion (18) comprising driving surfaces for rotation of the tool about the axis of rotation, and a web portion (23) between the outer edge (31) of the blank and the inner edge (portion) (18), the web portion having a first side (24) and a second side (27). At least two substantially circular guide grooves (21,22; 21', 22') are provided in the web portion on its first side, the guide grooves including an inner groove (21; 21'), which is the guide groove that is nearest the inner edge, and an outer groove (22; 22') which is the guide groove that is nearest the outer edge, the guide grooves being concentric with respect to the axis of rotation, and each guide groove having an inner wall (34, 35; 34', 35') on its inner side which faces the inner edge (19) of the blade.

29 Claims, 10 Drawing Sheets

WORKING TOOL AND MACHINE FOR SAWING AND CUTTING

TECHNICAL FIELD

The present invention relates to a working tool for sawing or cutting, comprising an annular blade intended to be rotated about an axis of rotation, encircling said axis of rotation, the annular blade comprising an annular blank and means, e.g. diamond segments, forming the working part of the tool and provided in connection to an outer edge of the blank, said blade also having an inner edge, an inner edge portion comprising driving surfaces for rotation of the tool about said axis of rotation, and a web portion between said outer edge of the blank and said inner edge portion, said web portion having a first side and a second side. The invention also concerns a tool assembly comprising at least said working tool.

Further, the invention relates to a machine for sawing or cutting, comprising a working tool, a drive-wheel for rotation of the tool about an axis of rotation, at least two guide rollers, at least two support rollers and a drive machinery comprising a power source and a power transmission for rotation of the drive-wheel, said working tool comprising an annular blank and means, e.g. diamond segments, forming the working part of the tool and provided in connection to an outer edge of the blank, also having an inner edge, an inner edge portion comprising driving surfaces for rotation of the tool about said axis of rotation, and a web portion between said outer edge and said inner edge portion, said web portion having a first side and a second side, said drive-wheel being in operative engagement with said driving surfaces of the inner edge portion, and said guide rollers and support rollers contacting said first and second side, respectively, of said web portion of the annular blade

PRIOR ART

Annular working tools for cutting or sawing, as well as machines, which are provided with such tools, are known since long. A pioneer in this field was inventor Ermanno Santilli, to whom a number of patents were granted in the 1970's. An example of a Santilli-machine, including an annular cutting or sawing blade, is shown in the U.S. Pat. No 3,930,310. In spite of its potential merits, however, the Santilli-machine never met with a technical or commercial success. A breakthrough of this technology was not achieved until inventor Mats Johansson in the 1980's, disclosed in the U.S. Pat. No. 4,646,607 and the U.S. Pat. No. 4,793,065 made some significant inventions. The blade included in the cutting or sawing machines of these patents was designed in the way which is described in the above preamble, wherein a single guide groove is provided in the web portion of the blade. Further, the working machine includes two guide rollers, each of which is provided with a single guide flange in engagement with the guide groove of the blade. Moreover, force-exerting members are included to press the inner flank of each guide flange against an inner wall of the guide groove. Hereby, the blade is clamped in the axial direction between the guide rollers on a first side of the web portion and support rollers on the opposite, second side of the web portion under contributory action by a drive-wheel which engages the inner edge portion of the blade, while the blade is clamped in the radial direction between the drive-wheel and the guide rollers' guide flanges which are pressed against the inner sides of the guide grooves. Improvements of this system of clamping the blade/working tool are disclosed in the U.S. Pat. No. 6,336,273 and U.S. Pat. No. 6,374,501.

DESCRIPTION OF THE PRINCIPLES OF THE INVENTION

The above briefly described system for driving the blade/working tool, and for clamping the rotating blade/working tool, operates very well. From that background, therefor, one has not found any reason to change it. For example, one has found no reason to provide the blade with more than one guide groove, and the guide rollers with more than one guide flange, although it is mentioned in said U.S. Pat. No. 4,793,065 that the web of the blade is provided with at least one guide groove, an expression which does riot exclude more than one groove.

However, the service-life of the working part of the tool is a matter of concern. The service-life is considered to be too short, even if the working part includes diamond-equipped segments, which are secured to the outer edge of the blade. This is a serious shortcoming of the presently used, diamond equipped annular tools, particularly in view of the fact that they are expensive due to the employment of diamond segments.

Now it has surprisingly turned out that the service-life of the working part of the tool, and hence of the entire tool, is significantly prolonged if, according to a first aspect of the present invention, at least two substantially circular guide grooves are provided in the web portion on its first side, said guide grooves including an inner groove, which is the guide groove that is nearest the inner edge, and an outer groove which is the guide groove that is nearest the outer edge, the guide grooves being concentric with respect to said axis of rotation, and each guide groove having an inner wall on its inner side which faces the inner edge of the blade. Further there are surprising indications that the service-life of the drive-wheel is prolonged. Also the service-life of the guide rollers is prolonged.

The annular tool of the invention is further intended, for the provision of the above mentioned improvement of the working life of the tool, to co-operate with a machine of the type referred to in the preamble, wherein at least two substantially circular guide grooves are provided in the web portion of the annular blade on its first side, said guide grooves including an inner groove, which is the guide groove that is nearest the inner edge, and an outer groove which is the guide groove that is nearest the outer edge, the guide grooves being concentric with respect to said axis of rotation, and each guide groove having an inner wall on its inner side which faces the inner edge of the blade, that each of said guide rollers is provided with at least one guide flange, each guide flange having an inner flank facing the inner edge of the blade, that each guide flange is entered into engagement in a guide groove, and that clamping members are provided to press the inner flanks of the guide flanges against the inner walls of the guide grooves.

Further, performed tests have indicated that a considerable reduction of the energy consumption of the machine appear to be achieved through the provision of at least two guide grooves in the web portion of the annular blade instead of just a single groove, and of at least two guide flanges on the guide rollers instead of just a single guide flange on each guide roller. Also that achievement is most surprising, especially if the amendments of the annular blade and of the guide rollers cause slip between the guide flanges of the guide rollers and the engaged sides of the guide grooves, since slip instead should be expected to increase the energy consumption.

However, the provision of two or more guide grooves rather than a single groove in the web portion raises new problems, namely:

It could make the blade weaker. This, if not properly mastered, could lead to sudden failure of the blade.

The velocity of the rotating annular blade in the region of an outer guide groove is different (higher) than in the region of an inner groove or in the region of any intermediate groove, while the velocity of the guide flanges, which also rotate, are equal, if the diameters of the flanges are equal. This causes slip. The slip in turn enhances wear of the flanks of the guide flanges and it successively increases the width of the grooves. It indeed also consumes energy.

It is an object of the present invention, according to an aspect of it, to address also the above problems.

It is deemed that any sudden failure of the blade is initiated in the region of the outer edge of the blank, where stresses are generated as the peripheral part of the tool is working in working objects like reinforced concrete. Therefor it is suggested, according to an aspect of the invention, in order to eliminate or at least reduce the risk of hazardous stresses in the blank material, that the guide grooves are provided within a rather narrow, annular zone of the blank adjacent to the inner edge portion, i.e. at quite a distance from the outer periphery of the tool. More particularly, it is suggested that the guide grooves are provided within the region of an annular zone of said web portion adjacent to said inner edge portion, said zone extending from said inner edge portion in the radial direction to a distance from the inner edge corresponding to not more than 70%, preferably not more that 60% of the entire width of the blade as measured from the inner edge to the outer edge of the blank.

Further, as far as the slip problem is concerned, it can be solved by designing the guide rollers and/or the annular blank such that any slip is either reduced so much that it can be regarded as negligible or such that any slip is essentially avoided. The first problem solution—reducing the slip to a negligible degree—can be achieved by accommodating the guide grooves within a zone of the web portion, which is narrow in relation to the width of the web portion of the blank, and by providing the guide flanges of each guide roller correspondingly narrow such that they can operate in the guide grooves. If the radii of guide flanges are equal, which means that they have equal velocities, when rolling in the guide grooves, the relative slip, in this text referred to as RS, between the flanges engaging the inner and outer grooves in the web in terms of percent is $$RS = \frac{v(2\pi Ro - 2\pi Ri)100}{v(2\pi Ro + 2\pi Ri)/2} \equiv \frac{200(Ro - Ri)}{Ro + Ri}$$

Where:
Ro is the radius of an outer guide groove in the position of the inner wall of that groove,
Ri is the radius of an inner guide groove in the position of the inner wall of that groove, and
v is the velocity of rotation of the annular tool Tests which have been performed and which are reported in the following, have indicated that a slip of RS=2.15% is harmless. In these tests, the measure Ro–Ri plus the width of the outer groove corresponded to about 20% of the width of the said web portion. According to one more aspect of the invention up to 6%, preferably max. 5% slip, should be agreeable. This means that, if only a very narrow rolling zone is left for the guide roller to roll on between the inner guide groove and the inner edge portion, the guide grooves can be accommodated within a zone bordering the inner edge portion and having a width which need not exceed about 70%, and not even about 60% of the width of the web portion. The conditions for restricting the slip to an acceptable level and for avoiding harmful stresses in the blade, in other words harmonise very well with one another.

Figure 8:
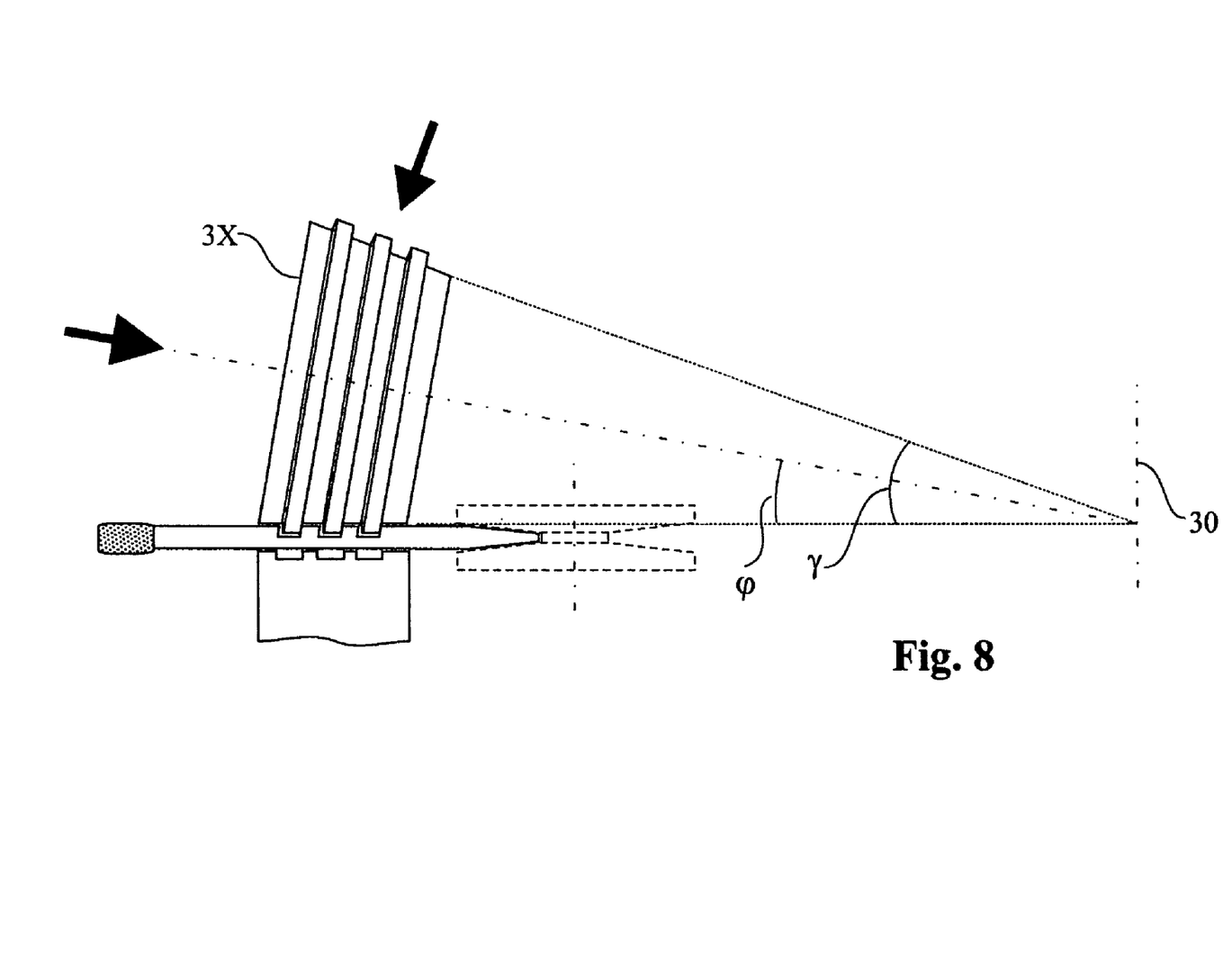

Now, as far as the other solution of the slip problem is concerned, essentially eliminating it, reference is first made to FIG. 8. The guide roller of the assembly shown in that figure, which is schematic, is conical. This means that the radius Ro of a first guide flange nearest the base of the cone is larger than the radius Ri of the other guide flange. If the top angle γ of the cone is chosen properly, more particularly such that the top of the conceived cone is positioned where the axis of rotation 30x of the annular blade 3x interacts the centre plane 45x of the blade 3x, it is possible to make the following conditions valid:

$$v_{er} 2\pi r_o = v 2\pi Ro$$

$$v_{er} 2\pi r_i = v 2\pi Ri$$

where
$v_{er}$=the velocity of rotation of the conical guide roller,
v=the velocity of rotation of the annular blade,
$r_o$=the radius of the outer guide flange,
$r_i$=the radius of the inner guide flange,
Ro=the radius of the outer guide groove in the region of its inner wall, and
Ri=the radius of the inner guide groove in the region of its inner wall.

When these conditions apply, the velocities of the inner flanks of the guide flanges are essentially equal to the velocities of the inner walls of corresponding guide grooves, and there is essentially no slip. However, although the solution of the slip problem illustrated in FIG. 8 is a solution which is possible in theory, it is not a preferred solution, because it has a major practical inconvenience. The axis of rotation of the conical guide roller is not parallel to the centre plane 45x and of the annular blade 3x. That makes it difficult to design machine parts, which can apply a proper pressure of the guide flanges of the guide roller on the inner walls of the guide grooves of the annular blade.

Therefor, according to a solution of the slip eliminating problem which is suggested according to a further aspect of the invention, that the guide grooves in the web portion of the annular blade are made increasingly deeper in the direction from the inner groove towards the outer groove. In particular it is suggested that at least one of a first line and a second line is inclined to diverse from a centre plane of the blade in the direction towards the outer edge of the blank and forms an angle smaller than 12°, suitably smaller than 8° to the centre plane of the blade, said first line running in a radial plane of the blade connecting the corner between the inner wall and the bottom of the outer guide groove and the corner between the inner wall and the bottom of the inner guide groove and said second line running in a radial plane of the blade connecting the corner between the inner wall of the outer guide groove and the top surface of the web portion adjacent to the outer guide groove and the corner between the inner wall of the inner guide groove and the top surface of the web portion adjacent to the inner guide groove. Further, as far as the machine is concerned, the axes of rotation of the guide rollers are made parallel with the centre plane of the annular blade and the axis of each guide roller is also parallel with the axis of rotation of the corresponding support roller on the opposite side of the annular blade. Moreover, the guide flanges of the guide rollers are made increasingly higher (matching the increased depth of the grooves in the annular blade) in the direction from an inner flange, engaging said inner groove, towards an outer flange, engaging said outer groove. In particular it is suggested, that in a radial plane of the blade coinciding with the axis of rotation of any of the guide rollers, a line connecting the corner between the inner flank and the top of the outer guide flange and the corner between the inner flank and the top of the inner guide flange, is essentially parallel with at least one of said first line and said second line. More specifically, the said inclined line also can be described as the side of a cone, the centre line of which intersects the centre plane of the annular blade in the centre of the blade, if said inclined line is transferred to a position where it is parallel with the centre plane of the blade.

Further features of the various aspects of the invention are stated in the appending patent claims and will also be explained in the following detailed description of two preferred embodiments and in the subsequent discussion.

BRIEF DESCRIPTION OF THE DRAWINGS

In the following detailed description of two preferred embodiments of the invention, reference will be made to the accompanying drawings, in which FIG. 7 shows, partly in section, the assembly of FIG. 4, along a line VII-VII in FIG. 4, FIG. 8 schematically illustrates the principles of eliminating slip between the inner flanks of the guide flanges of a conical guide roller and the inner side walls of the guide grooves of an annular blade.

DETAILED DESCRIPTION OF THE INVENTION

Figure 1:
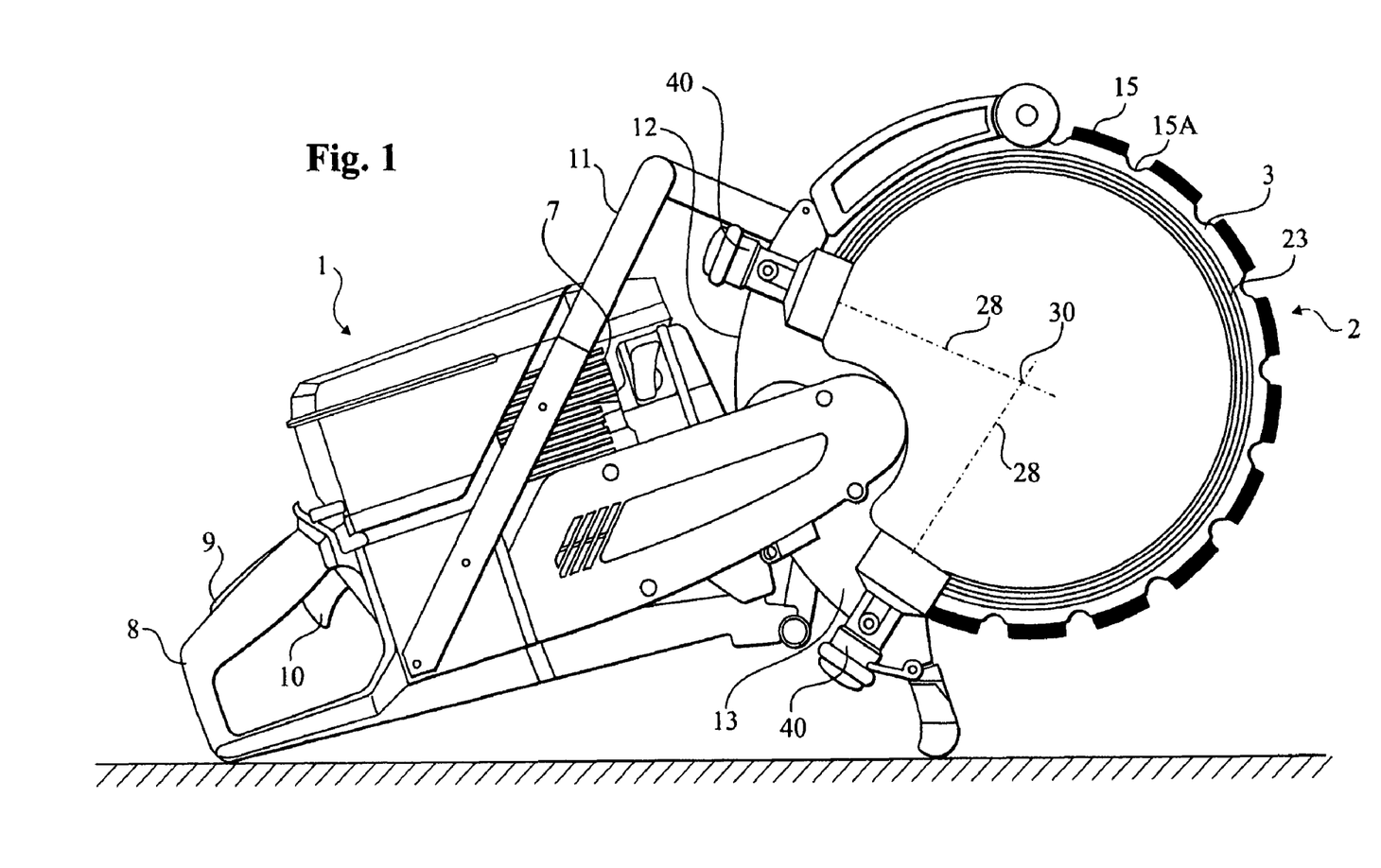
FIG. 1 is a side elevation of a cutting machine in which a first preferred embodiment of the invention has been implemented.
Figure 2:
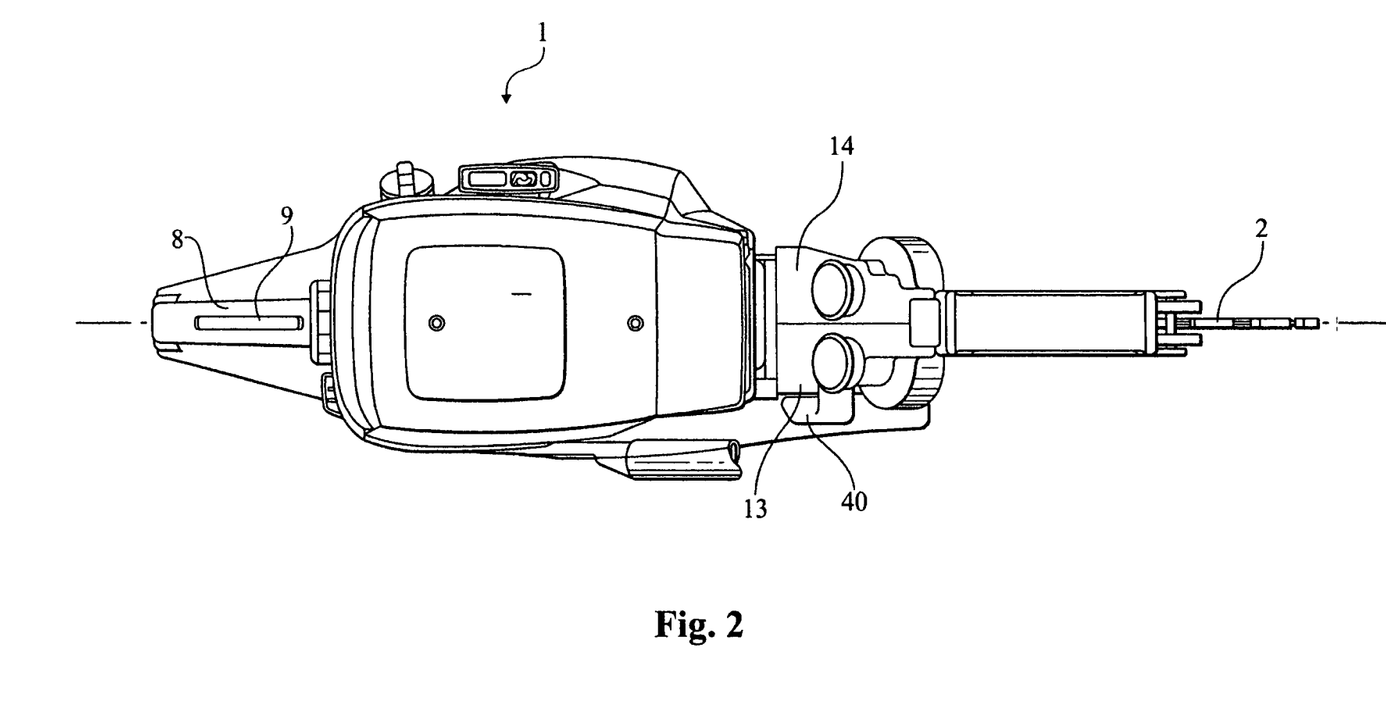
FIG. 2 is a top view of the same machine.
Figure 3:
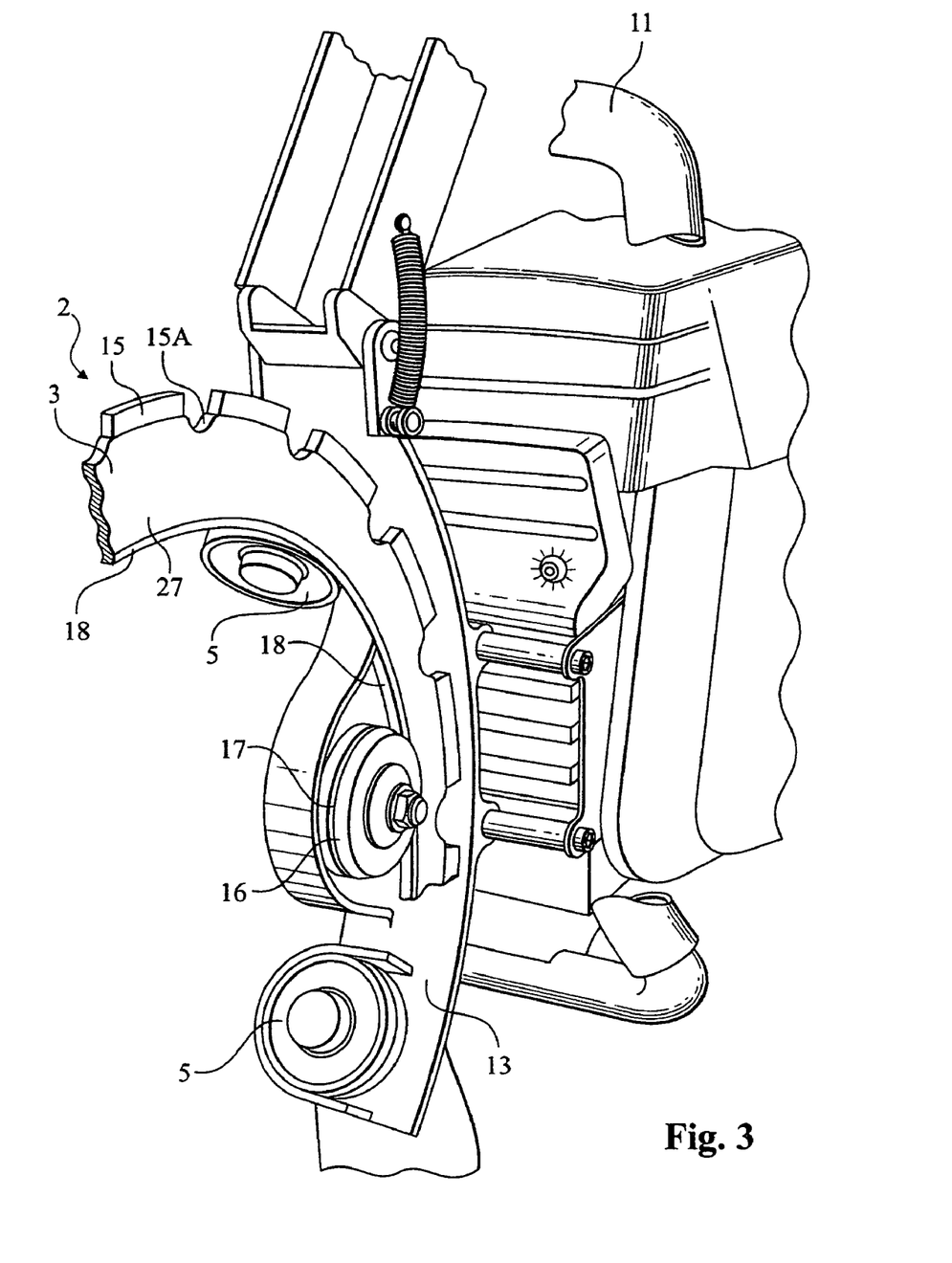
FIG. 3 is a perspective view, showing parts of the machine obliquely from the front and from the left.

The basic design of the machine 1 shown in FIG. 1-3, usually referred to as ring-cutter, is identical with that of the machine which is manufactured by a company related to the company of the assignee and marketed under the trade-name Partner®K950 Ring, disclosed in the U.S. Pat. No. 6,374,501. The novel design features of the machine of the invention concern the annular blank 3, which, equipped with diamond segments 15, forms the basic structure of the blade/working tool 2. The novel features also relate to the two guide rollers 5 and may also include a pair of support rollers 6. The machine—the ring-cutter 1—will not be described in any detail in this text, only its main parts and features which are important for the understanding of the present invention. Instead, reference is made to said U.S. Pat. No. 6,374,501, the disclosure of which is incorporated in the present patent description by reference.

The ring-cutter 1 has a rear part and a front part. In the rear part there is a motor-housing accommodating a combustion engine 7, which is the power source of the machine 1, a rear control handle 8 with controls 9, 10 and a front handle 11. The annular working tool or blade 2 including the annular blank 3 is provided in a blade holder unit 12 in the front part of the machine. The blade holder unit 12 comprises a first cover, in this text denominated guide roller cover 13, on the right hand side of the machine. The guide roller cover 13 accommodates the two guide rollers 5. A second cover, on the left hand side of the machine, is denominated support roller cover 14 and accommodates the two support rollers 6. The guide roller cover 13 also accommodates a drive-wheel 16 for the rotation of the blade 2. For that purpose, the drive-wheel 16, in a manner known per se, is provided with a circumferential, wedge-shaped groove 17, in which the inner, correspondingly wedge-shaped edge portion 18 of blank 3 is engaging. The drive-wheel 16 is mounted on and is rotated by an output shaft of a not shown belt-pulley driven by the engine 7 via a belt transmission. The shaft, which drives the drive-wheel 16, is journalled in a bearing, which is mounted stationary in the guide roller cover 13.

The working tool 2 consists of an annular blank 3 and a great number of diamond segments 15. The annular blank 3 has an inner, circular edge 19 and an outer, circular edge 31. The diamond segments are thicker than the blade 3 and are secured to the outer edge 31 of the annular blank 3 through welding or soldering, or through any other technique which does not form part of the invention, evenly distributed around the periphery of the blank at a distance from each other. The diamond segments form the working part of the tool 2. Recesses in the spaces between adjacent diamond segments are designated 15A. It should be mentioned in this connection that the working part of the tool 2, need not necessarily consist of diamond segments at a distance from each other. Wear parts of other materials than diamonds can be conceived, such as cemented carbide materials, stellites, and others, and it is also possible to provide the wear resistant material continuously around the periphery of the annular blank, which in that case has no recesses 15A along its periphery. Regardless the type of material and/or design of the working part of the working tool 2, however, it is conceived that severe stresses may be induced not only in the working part of the tool during work, but also in a region of the annular blank, adjacent to the working part.

The annular blank has a substantially flat web portion 23 and said inner edge portion 18 which is wedge-shaped. The web portion has a first, substantially flat side 24, which faces the guide rollers 5, and a second, substantially flat, opposite side 27, which faces the support rollers 6.

According to the invention, the annular blank 3 is provided with a plurality of annular guide grooves, including an inner guide groove 21 and an outer guide groove 22 in the web portion on said first side. Each groove has a flat bottom and a depth t corresponding to slightly more than half the thickness of the web portion 23. Each groove 21 and 22 further has an inner circular wall 34 and 35, respectively, which is square to a centre plane 45 of the blade and coaxial with the axis of rotation 30 of the annular blank 3/working tool 2.

Further, according to an aspect of the invention mentioned in the foregoing, all of the guide grooves, included in said plurality of guide grooves, are located within an annular zone of the web portion, in the following referred to as a groove zone Z, at quite a distance from the peripheral working part of the working tool. More particularly, the groove zone Z is located at a short distance from the inner edge portion 18 of the annular blade.

Between the groove zone Z and the inner edge portion, there is a first, annular rolling and clamping zone 51 which is flat and narrow. Between the grooves 21, 22, the top surface of the web portion forms a second, flat, annular rolling and clamping zone 52 which is slightly wider than the first one but still narrow, and outside of the outer guide groove the surface of the web portion defines a third, flat, annular rolling and clamping zone 53.

The groove zone Z extends from said first annular zone 51 a certain distance in the radial direction towards the outer edge. In the example, which is illustrated in FIG. 4-7, the number of guide grooves is two, and the width of the inner rolling and clamping zone 51 plus the groove zone Z corresponds to about 43% of the total width W of the annular blank 3, measured from the inner edge 19 to the outer edge 31. The width of the groove zone Z alone corresponds to about 32%, and the width of the first rolling and clamping zone 51 alone to about 11% of the total width W. The total width W in turn corresponds to about 18% of the outer radius of the annular blank 3.

Figure 4:
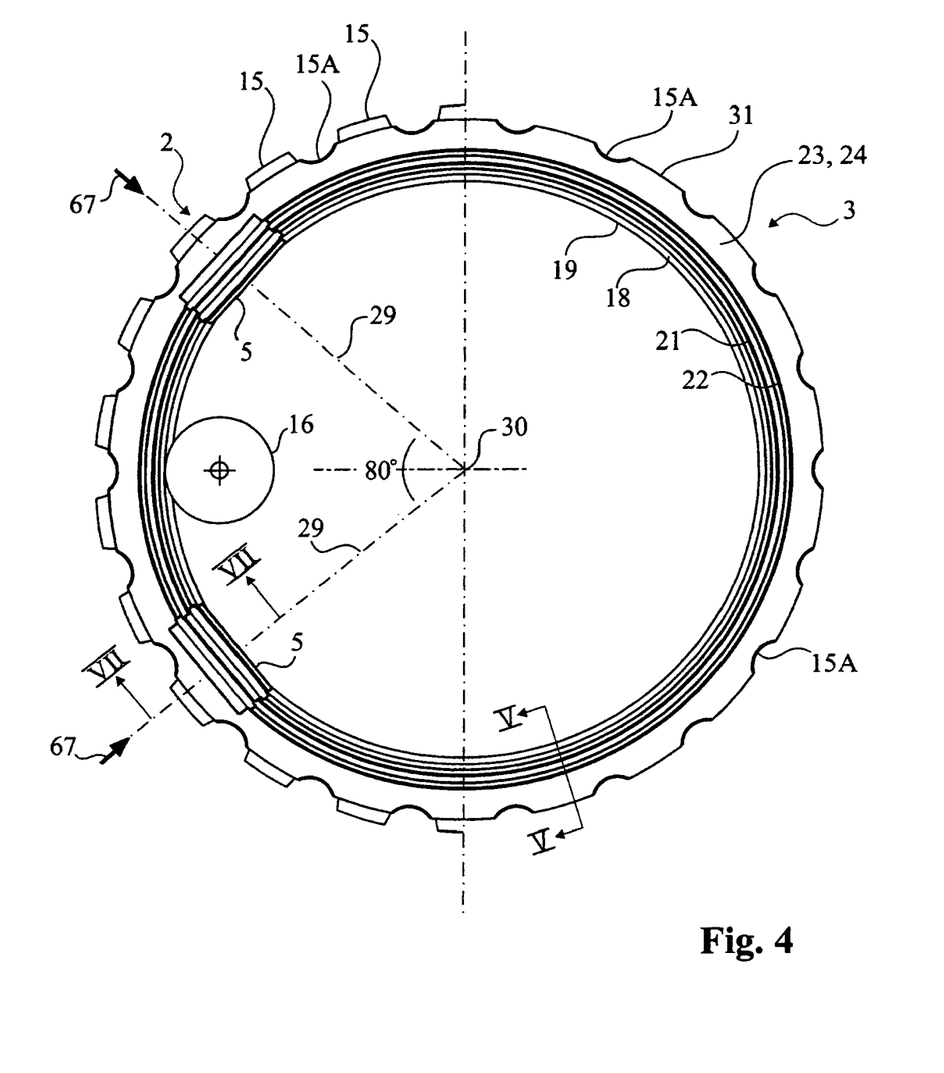
FIG. 4 shows a tool assembly (left hand part), including a working tool (a blade), two guide rollers and a drive-wheel; and the basic structure of the blade—an annular blank—(right hand part), according to a first preferred embodiment of the invention.

The two guide rollers 5 of the tool assembly, shown on the left hand part of FIG. 4, are arranged symmetrically on either side of a plane that is defined by the rotational axes of the working tool 2/annular blank 3 and the drive-wheel 16. The axes of rotation 28 of the guide rollers 5 are parallel with the centre plane 45 of the annular blade and are directed radially, so that the extensions of said axes of rotation 28 will intersect the axis of rotation 30 of the annular blank 3. The angle between the axes of rotation of the guide rolls 5 is about 80°.

Figure 6:
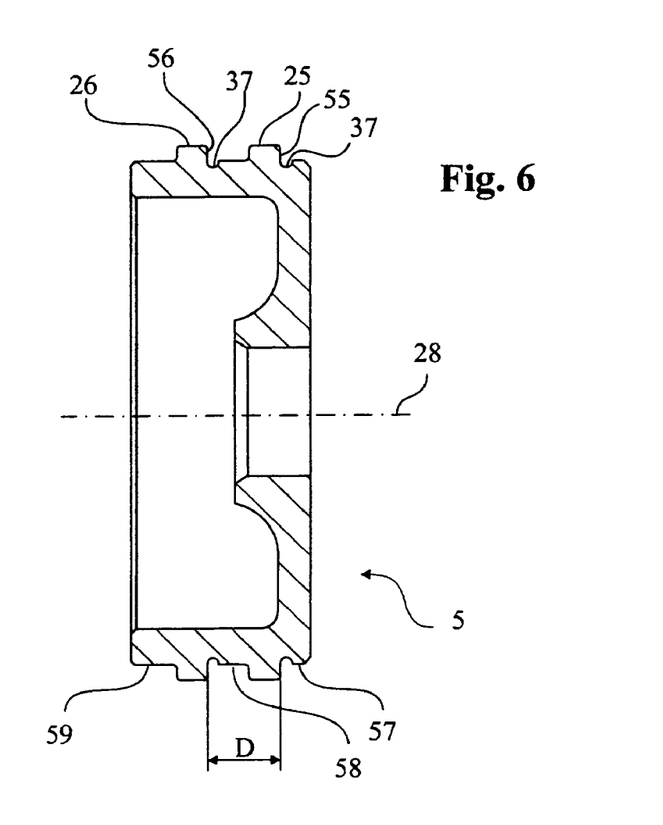
FIG. 6 is an axial cross-sectional view of a guide roller, intended to be included in the machine shown in FIG. 1-3, co-operating with the annular blade.

Each guide roller, FIG. 6, is provided with an inner, annular guide flange 25 and an equal outer guide flange 26. The inner flanks of the guide flanges 25, 26, i.e. the flanks facing the inner edge of the annular blank 3 when the guide rollers and the working tool/blade 2 are assembled, are designated 55 and 56, respectively. Inside of the inner guide flange 25 there is a first cylindrical rolling and clamping surface 57 which is very narrow. Between the flanges 25, 26 there is a second cylindrical rolling and clamping surface 58, which borders the inner guide flange 25 and is broader than the first cylindrical surface 57, and outside of the outer guide flange 26 there is a third cylindrical rolling and clamping surface 59, which is still wider than the second cylindrical surface 58. The cylindrical surfaces 57-59 have equal diameters. The total width of each guide roller, measured from the inner borderline of the inner cylindrical surface 57 to the outer borderline of the outer cylindrical surface 59, is designated B in FIG. 7.

The height and width of the guide flanges 25, 26 are slightly smaller than the depth t and width of the guide grooves 21, 22, such that the guide flanges may be entered into the guide grooves without the top surfaces of the flanges touching the bottom of the grooves and also leaving a slight space between the outer flanks of the flanges and the inner walls of the grooves, when the inner flanks 55, 56 of the flanges 25, 26 are pressed against the inner walls 34, 35 of the guide grooves, and the first, second and third cylindrical rolling and clamping surfaces 57, 58, and 59 of the guide rollers contact the first, second and third annular and flat, rolling and clamping surfaces 51, 52 and 53, respectively, of the annular blank 3. In order that said contact shall be effectively established, a very small annular recess 37 is made in the guide rollers in the transition between the inner flanks 55, 56 of the flanges 25, 26 and the first and second cylindrical surface 57 and 58, respectively. The axial distance D between the inner flanks 55, 56 of the guide flanges equals the radial distance D between the inner side walls 34, 35 of the guide grooves of the annular blank 3.

Figure 7:
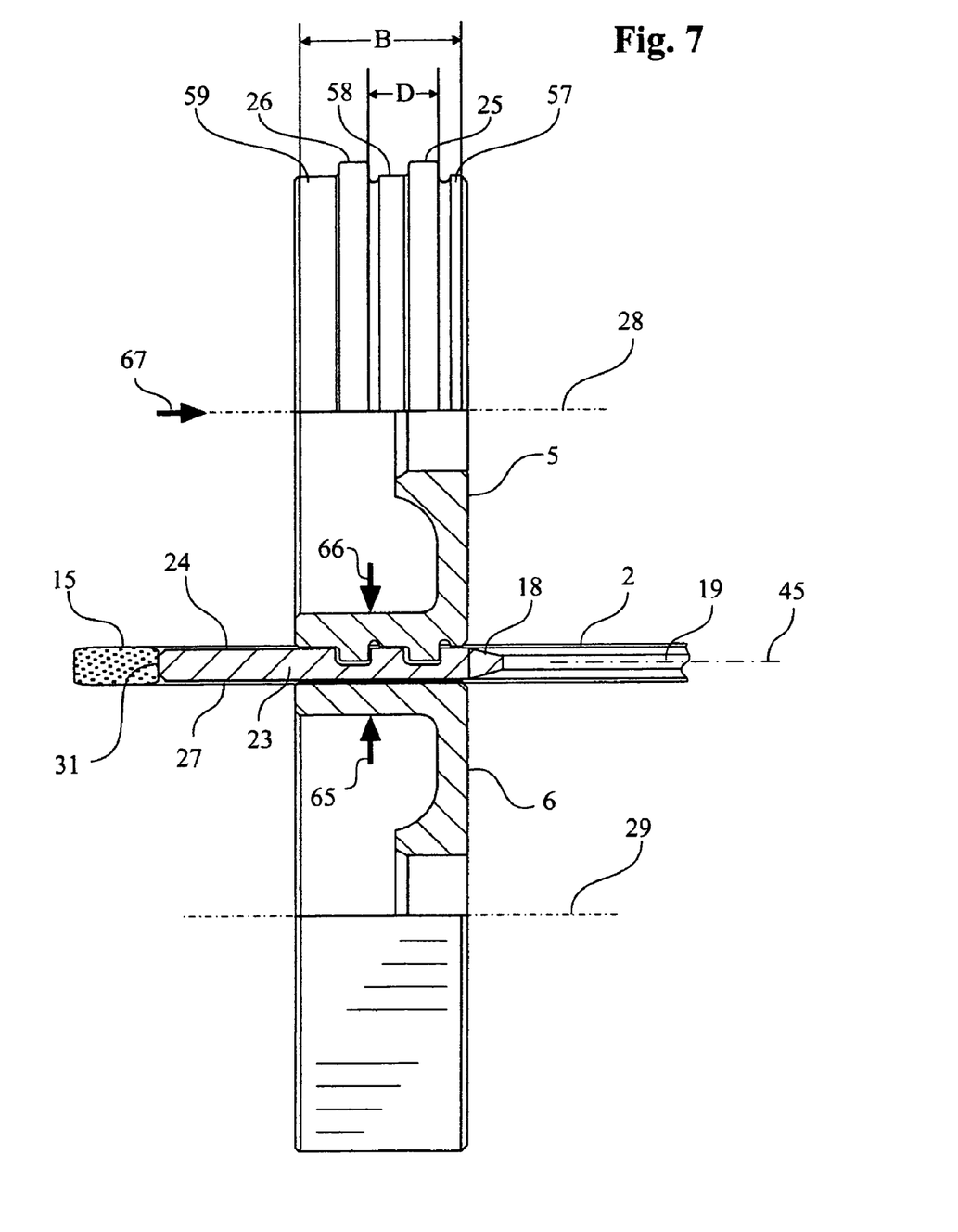

The support rollers 6 have a substantially smooth, cylindrical surface 38, the total width of which usually equals the total width B of the each guide roller. In the assembled machine 1, each pair of guide- and support rollers is arranged in relation to the working tool 2 and to the annular blank 3 as is shown in FIG. 7, the rotational axis 29 of the support roller 6 of each such pair on the second side of the annular blade 3 being parallel to the rotational axis 28 of the guide roller 5 of the same pair of rollers. The cylindrical surface 38 of each support roller 6 contacts the substantially flat surface of the second side 27 of the web portion 23 of the annular blank 3. The region of contact between the support rollers 6 and the second side 27 of the blank 3 extends from the inner edge portion 18 of the blade equally far towards the working part of the tool as the said third cylindrical surface 59 of each guide roller 5. A safe contact is established by means of adjustment screws (not shown), which are provided in said support roller cover 14. By adjusting the screws, the support rollers are pressed with a slight pressure against the second side 27 of the blank 3. The pressure, indicated by arrow 65, is adjusted by means of the screws to be sufficient to establish just contact between the cylindrical surface 38 of the support rollers 6 and the substantially flat surface on the second side 27 of the blank, and also contact between the three cylindrical surfaces 57-59 of the guide rollers 5 and the corresponding annular surfaces 51-53 on the first side 24 of the blank under counterpressure by the guide rollers indicated by arrow 66. The annular blade 2 thus is held clamped in the axial direction between the pair-wise arranged guide and support rollers, the axial pressure not exceeding what is required to established safe contact on both sides of the blade as explained above.

Contact between the guide rollers 5 of the tool assembly and the first side 24 of the blade 2, and contact between the support rollers 6 and the second side 27 of the blade 2, respectively, are restricted to an annular zone, which is located adjacent to the inner edge portion 18 of the blank 3. The width of said annular zone corresponds to the width B of the rollers and amounts to at least 15%, preferably to at least 30%, but does not exceed 70%, preferably not exceed 60%, of the total width W of the blank 3.

A much more powerful contact pressure is required between the bevelled surfaces of the wedge-shaped groove 17 of the drive-wheel 16 and the correspondingly bevelled surfaces of the inner edge portion 18 of the annular blank 3, in order to guarantee a safe friction driving between the drive-wheel 16 and the annular blank 3. Therefor the annular blade is pressed with its inner edge portion 18 in the radial direction against the drive-wheel 16 to establish firm frictional contact between the said bevelled surfaces. The required force is provided by means of clamping devices 40, which may have a design known per se, e.g. any of the designs disclosed in the U.S. Pat. Nos. 4,793,065 and 6,336,273. One such clamping device 40, FIG. 1 and FIG. 2, is assigned to each guide roller 5. Each clamping device 40 exerts an axial force on its respective guide roller 5, forcing the guide roller in its axial direction, corresponding to the radial direction of the annular blank 3 and of the annular blade 2. The force of each clamping device 40, symbolically indicated by an arrow 67 in FIG. 4 and FIG. 7, is transferred to the annular blade 2 via the inner flanks 55, 56 of the inner and outer guide flanges of the rollers and the inner side walls 34, 35 of the inner and outer guide grooves of the annular blank. The forces exerted by the two clamping devices 40 thus are distributed between, and transferred to the annular blade 2, via in total four sites of contact between the guide rollers 5 and the annular blank 3. The direction of the resulting force corresponds to the radial direction of the drive-wheel 16, causing the desired friction driving to be established.

Performed Experiments

Experiments were performed with a machine 1, provided with an annular working tool or blade 2 including an annular blank 3, two guide rollers 5, and two support rollers 6 designed according to the preferred embodiment of the invention, which has been described above with reference to FIG. 1-7. The radii of the outer and inner guide grooves 22 and 21, respectively, of the annular blank 3, in the region of their respective inner side walls 34 and 35, had the following measures:

Ro=156.6 mm

Ri=150 mm

According to the formula given in the foregoing in the description of the principles of the invention, this gives a relative slip RS=2.15%. Other measures of interest were:
- Width of first annular zone 51=3.5 mm
- Width of groove zone Z=10 mm
- Width of first annular zone 51+groove zone Z=13.5 mm
- Total width W of the annular blank=31 mm
- Distance D between inner side walls of inner and outer guide grooves=6.5 mm
- Width B of guide rollers and of support rollers=15 mm
- Width of guide grooves=3.5 mm
- Depth of guide grooves=1.7 mm
- Thickness of annular blank=3.1 mm
- Outer diameter of guide flanges=50 mm Standard guide rollers having a single guide flange and annular blanks having only a single, matching guide groove where used as reference devices. These standard blanks were equipped with diamond segments of a type which was identical with the type of diamond segments of the working tool of the invention.

The experiments were carried out by making cuts in a working material consisting of blocks of reinforced concrete having a thickness of 230 mm. The total surface of the cut which each working tool, i.e. annular blade, had made in the working material was measured, when the diamond segments had been completely consumed. Two working tools of the invention were tested in comparison with one standard tool. The results are given in the table below.

| Type of working tool | Service-life in terms of cut surface m² | Improvement over standard tool % |
|---|---|---|
| Standard tool | 4.5 | |
| Invention | 12.8 | 184 |
| Invention | 10.4 | 131 |

As is apparent from the above table, significantly large improvements were achieved with the annular working tool of the invention over the standard tool as far as the service-life of the tools in terms of cut surface is concerned. It is difficult to explain the reasons for this achievement, and particularly difficult is it to explain the magnitude of the improvement. However, this issue will be discussed in the ending part of this description as well as what impact any conceivable theory, that can explain the results, may have upon conceivable modifications and/or further improvements of the invention. Other noticed improvements which were noticed but not quantified, concerned an improved efficiency of the machine in terms of consumed power, and reduced wear of the guide rollers, and reduced wear of the drive-wheel.

Now, a second, preferred embodiment of the invention will be described with reference to FIG. 9-FIG. 11. This second embodiment takes advantage of the theoretical merits of the principles of eliminating slip through the employment of a conical guide roller co-operating with an annular blade provided with guide grooves in the annular blank thereof, having equal depths according to FIG. 8, but has not incorporated the mentioned drawbacks of that solution of the slip problem.

Figure 5:
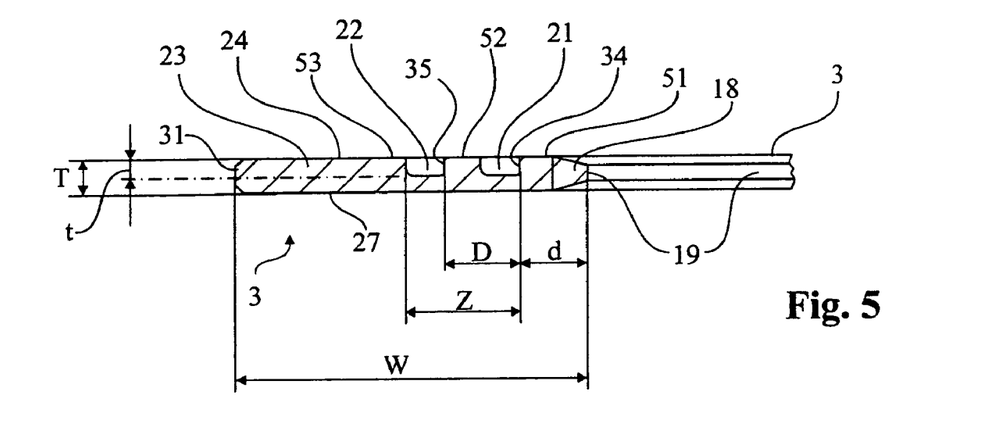
FIG. 5 is a cross-sectional view of the annular blank along a line V-V in FIG. 4.
Figure 9:
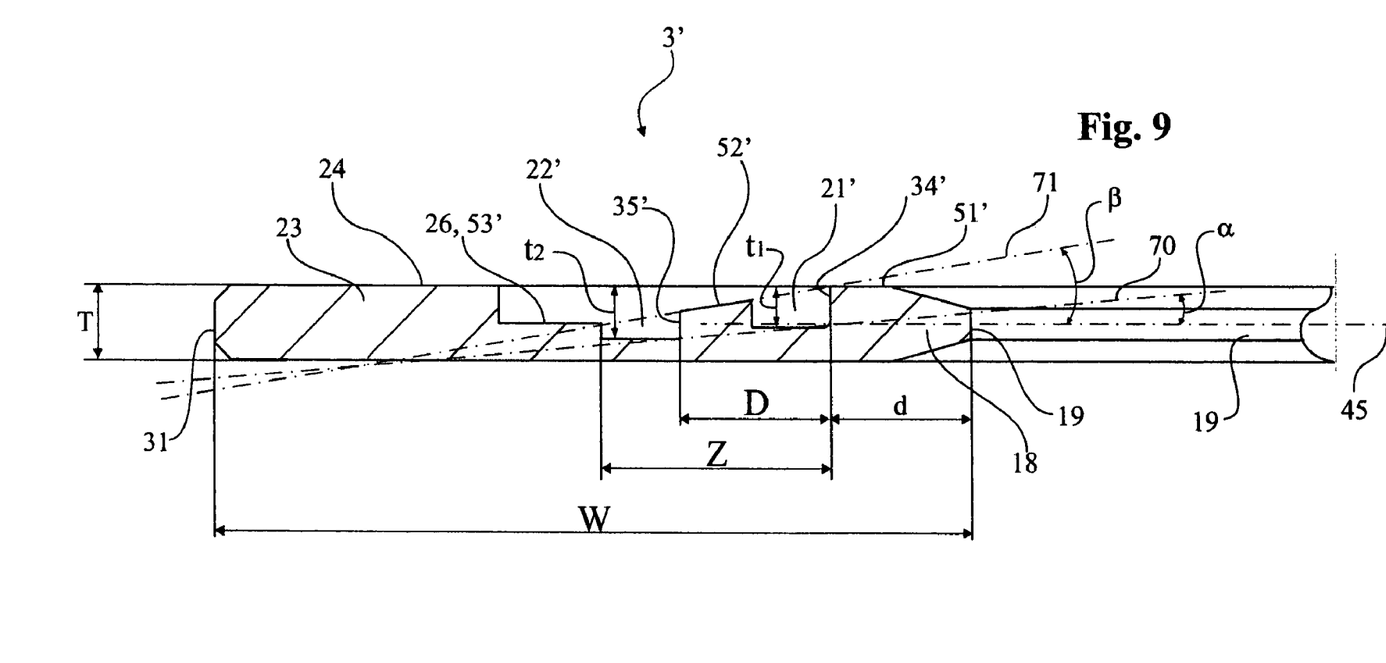
FIG. 9 is a cross-sectional view of an annular blank according to a second, preferred embodiment of the invention.
Figure 10:
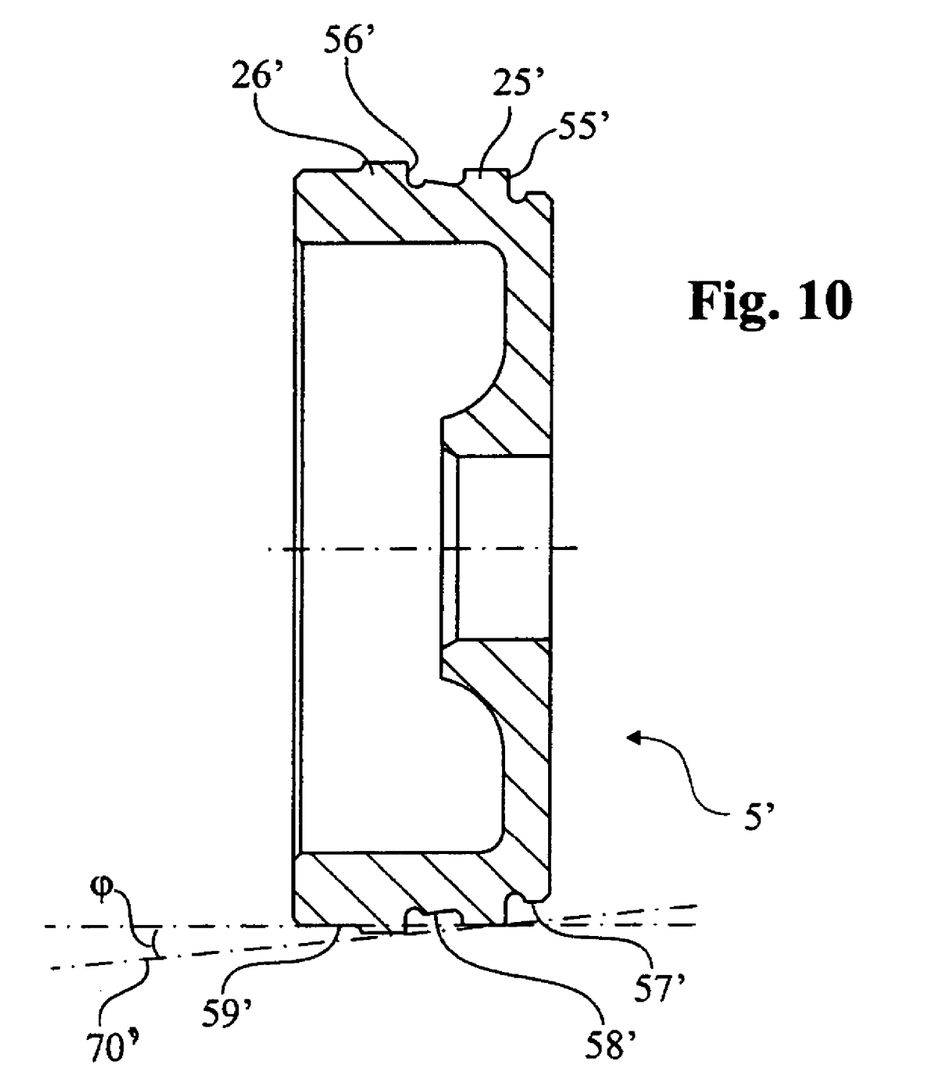
FIG. 10 is an axial cross-sectional view of a guide roller intended to co-operate with the annular blank of FIG. 9.
Figure 11:
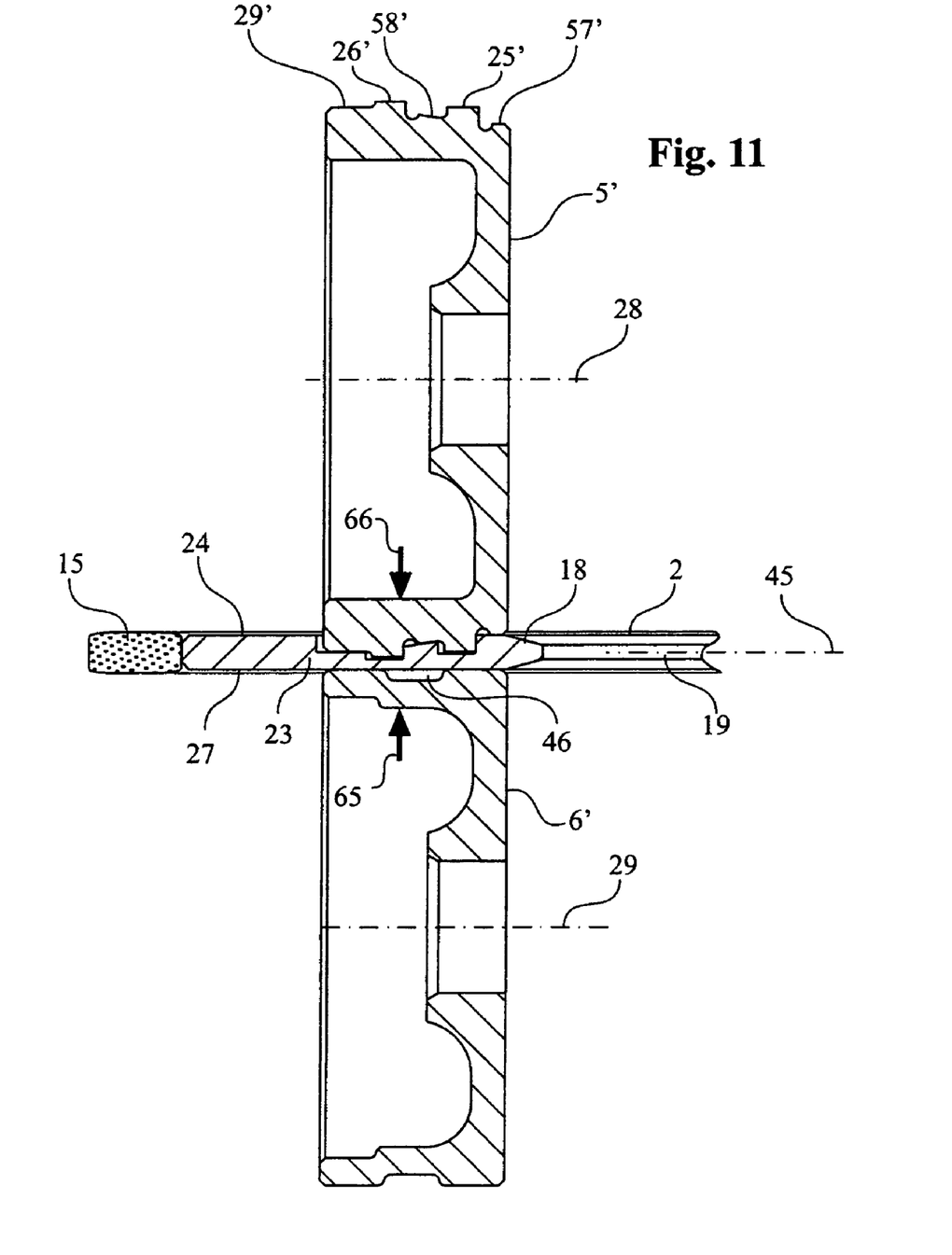
FIG. 11 is a cross-sectional view of a tool assembly including an annular blade, consisting of the diamond equipped blank of FIG. 9, the guide roller of FIG. 10, and a support roller.

In FIG. 9-FIG. 11, the same reference numerals have been used as in FIG. 5-FIG. 7 for corresponding, but differently designed details with the addition of the symbol '. As far as denomination of the various details is concerned, reference therefor is made to the description of the first embodiment.

According to the second embodiment of the invention, the axes of rotation 28' of the guide rollers 5' are parallel with the centre plane 45 of the annular blank 3', which is true also for the previous embodiment, but the radii of the guide flanges 25' and 26' are different, and the guide grooves 21' and 22' are adapted so as to match the guide flanges. The radius $r_o$ of the outer guide flange 26' is larger than the radius $r_i$ of the inner guide flange 25'. The difference is such that a conceived line 70' in an axial plane of the guide roller 5' connecting the corner between the inner flank 55' and the top of the inner guide flange 25' with the corner between the inner flank 56' and the top of outer guide flange 26' will form an angle φ. The inclination angle φ is half the top angle γ of a conceived cone according to the embodiment of FIG. 8. This means that if the guide roller 5' were tilted so much that the line 70' was brought to be parallel to centre plane 45 of the blank 3', the axis of rotation 28' would intersect the axis of rotation of the annular blank 3' in the point of intersection between the said axis of rotation of the annular blade and the centre plane 45 of the blank. In the illustrated embodiment the angle φ, corresponding to half the top angle of the conceived cone, is about 7°.

The top surfaces 39' of the guide flanges 25' and 26' are parallel to the centre plane 45. The second rolling and clamping surface 58', however, is conical. More specifically, it forms a segment of a regular cone having a top angle twice as large as the angle φ. The first and third rolling and clamping surfaces 57 and 59' are cylindrical, but clamping surface 59' has a larger radius than clamping surface 57'. However, surface 58' could be cylindrical and the mating surface 52' parallel with line 45'.

The support roller 6' is provided with a central annular recess 46, which concentrates the clamping pressure exerted by the support roller to the inner and outer regions of the rollers, including the regions of the cylindrical and flat surfaces and zones, respectively, but not the conical surfaces and zones.

The annular blank 3' has an inner guide groove 21' and an outer guide groove 22'. The widths of the grooves 21', 22' are slightly larger than the widths of the corresponding guide flanges, and depths t1 and t2, respectively, which as in the previous embodiment are slightly larger than the heights of the corresponding guide flanges. The rolling and clamping zones 51'-53' match the corresponding surfaces of the guide roller 5', wherein the first rolling and clamping zone 51' is flat, the second rolling and clamping zone 52' is conical and the third rolling and claming zone 53' is flat. The second and third ones 52' and 53' are recessed in the web portion 23' of the annular blank 3', while the first zone 51' forms part of the first side of the web portion and borders the inner edge portion 18.

With reference to FIG. 9, a first line 70, running in a radial plane of the blank, connects the corner between the inner wall 35' and the bottom of the outer guide groove 22' and the corner between the inner wall 34' and the bottom of the inner guide groove 21'. This first line 70 is usually parallel to the above mentioned line 70', when the tool is assembled as shown in FIG. 11. This means that the said angle α equals the above mentioned angle φ of about 5°. Further a second line 71 running in a radial plane of the blank connects the corner between the inner wall 35' of the outer guide groove 22' and the top surface of the web portion 52' adjacent to the outer guide groove and the corner between the inner wall 34' of the inner guide groove 21 and the top surface of the web portion 51' adjacent to the inner guide groove. This second line 71 forms an angle β to the centre plane 45 amounting to about 10°. The inclination of said second line 71 as defined above, however, can be reduced by increasing the height of the inner wall 35' of the outer groove 22' so as to more or less correspond to the inclination of the first line 70. In other words, the angles α and β can be made to be essentially equal.

Suitably, the second rolling and clamping surface 58' of the guide rollers 5' is parallel to the top surface of the second rolling and clamping zone 52' of the blank 3'. In the assembly tool, including guide rollers and support roller units, as shown in FIG. 11, the matching rolling and clamping surfaces and zones, respectively, including the rolling and clamping surfaces and zones 58' and 52', respectively, contact each other under a slight pressure between the support rollers 6' and the guide rollers 5', while the inner flanks of the guide rollers are pressed by a comparatively strong force in the axial direction against the corresponding inner side walls of the guide grooves in the same mode as according to the first embodiment. In the embodiment described with reference to FIG. 9-FIG. 11, however, essentially no slip takes place between the inner flanks and the inner side walls, at least no noticeable slip caused by the design as is the case in the first embodiment, described in the foregoing. However, slip may occur between the rollers and the annular blade also in the second embodiment including conical surfaces as well, because of insufficient contact pressure and/or operating overload, etc. The widths of the rolling and clamping surfaces and zones, as well as the widths of the guide flanges and guide grooves were the same as in the previous embodiment. Therefore also the absolute and relative measures relating to the groove zone Z' and the combined first zone 51'+the groove zone Z' are the same as in the first embodiment. If also the recessed third annular zone 53' is considered in the evaluation of the strength of the annular blade, the distance from the inner edge 19 to the outer periphery of the recessed zone 53' corresponds to 67% of the entire width of the annular blade 3', i.e. more than doubling the service-life.

There is also a further embodiment based on the principal that contact starts between one inner flank and one sidewall only of guide roller and blade. These parts will wear and when this wear has progressed to a suitable degree another inner flank of a neighbouring guide flange will come into contact with another sidewall of a neighbouring guide groove. This is created by the following layout. The radial distance D between the inner wall 34; 34' of the inner guide groove 21; 21' of the working tool and the inner wall 35; 35' of the outer guide groove 22; 22' of the working tool is smaller than the distance D between two inner flanks 55, 56; 55', 56' on two neighbouring guide flanges 25, 26; 25', 26', such that only one inner flank will contact its corresponding inner wall in a new tool assembly and this will change only after a suitable amount of wear of the inner flank and/or inner will in contact has taken place.

Discussion

The experiments which have been reported in the foregoing showed that it was possible to achieve improvements well exceeding 100% if the standard working tools and guide rollers were replaced by tools and guide rollers according to the first embodiment of the invention, i.e. more than doubling the service-life. The results i.a. implies that, at least when using standard tools/blades and guide rollers, only a minor part of the power that is transmitted to the working tool is used for effective cutting work, while the rest is lost. Hypothetically, the great losses at least to a great part can be due to intense vibrations and/or wobbling of the annular blade. On the other hand it is difficult to explain why such vibrations and/or wobbling should be drastically reduced because of the amendments of the design of the annular blank and of the guide rollers. However, most surprising, the service-life of the working tool indeed has been very much prolonged by replacing the standard tool and the standard guide rollers, having only a single guide groove, a single guide flange, with a tool and a pair of guide rollers having two guide grooves, two matching guide flanges and two rolling and clamping zones and surfaces, said guide grooves being positioned in an inner part of the web portion of the annular blade in order not to cause sudden failure of the working tool because of high stresses in the outer part of the web portion, adjacent to the working part of the tool. It is believed that further improvements could be achieved through the provision of more than two guide grooves in the first side of the web portion of the blank, a corresponding number of matching guide grooves on the guide rollers, and an increased number of rolling and clamping zones and surfaces, respectively. However, such improvements appear to be difficult to employ, if annular blades with currently used blank widths are employed, because that could lead to a weakening of the outer parts of the blank, near the working part of the tool, which should be avoided according to an aspect of the invention. In machines, on the other hand, which are provided with annular working tools with larger diameters, also the width of the web portion should be larger, which may allow the provision of three or maybe even four concentric guide grooves in the web portion of the blank, the provision of a corresponding number of matching guide flanges on the guide rollers and a correspondingly increased number of rolling and clamping zones and surfaces, respectively. In this connection it should also be mentioned that the wear of the guide flanges, as well as the wear of the inner walls of the guide grooves, were reduced when using the blade and guide roller according to the invention during the above reported experiments. This implies that the guide grooves of any suggested larger blade need not be widened in relation to the increased width of the blank, which in turn implies that there should be sufficient space for at least three or even more grooves in the inner part of the blank without jeopardising the strength of the blank. The guide rollers normally should be provided with a corresponding number of matching guide flanges.

The invention claimed is:

1. Working tool for sawing or cutting, comprising an annular blade (2) intended to be rotated about an axis of rotation, encircling said axis of rotation, the annular blade comprising an annular blank (3; 3') and means (15), comprising a plurality of diamond segments (15), forming a working part of the tool and provided in connection to an outer edge (31) of the blank (3; 3'), said blank also having an inner edge (19), an inner edge portion (18) comprising driving surfaces for rotation of the tool about said axis of rotation, and a web portion (23) between said outer edge (31) of the blank and said inner edge portion (18) of the blank, said web portion having a first side (24) and a second side (27), wherein at least two substantially circular guide grooves (21,22; 21', 22') are provided in the web portion on its first side, said guide grooves including an inner groove (21; 21'), which is the guide groove that is nearest the inner edge, and an outer groove (22; 22') which is the guide groove that is nearest the outer edge, the guide grooves being concentric with respect to said axis of rotation, and each guide groove having an inner wall (34, 35; 34', 35') on its inner side which faces the inner edge (19) of the blade, and the depth of the guide grooves (21', 22') are increasingly deeper in the direction from the inner groove towards the outer groove.

2. Working tool according to claim 1, wherein the guide grooves are provided within the region of an annular zone (Z) of said web portion (23) adjacent to said inner edge portion (18), said zone extending in the radial direction not more than 70% of the entire width (W) of the blank (3; 3') as measured from the inner edge (19) to the outer edge (31) of the blank.

3. Working tool according to claim 2, wherein the width of said annular zone (Z) corresponds to not more than 60% of the entire width (W) of the blank.

4. Working tool according to any of claims 1-3, wherein at least one of a first line (70) and a second line (71) is inclined to diverse from a centre plane (45) of the blade in a direction towards the outer edge (31) of the blank (3; 3') where the two lines form an angle (a, b) smaller than 12 degrees, suitably smaller than 8 degrees to the centre plane (45) of the blade, said first line (70) running in a radial plane of the blade connecting a corner between the inner wall and the bottom of the outer guide groove and a corner between the inner wall and the bottom of the inner guide groove and said second line (71) running in a radial plane of the blade connecting a corner between the inner wall of the outer guide groove and the top surface of the web portion (52') adjacent to the outer guide groove and a corner between the inner wall of the inner guide groove and the top surface of the web portion (51') adjacent to the inner guide groove.

5. Working tool according to claim 4, wherein a corner formed between the inner wall (34, 35; 34', 35') and the bottom of any intermediate guide groove (21, 22; 21', 22') is positioned substantially along said first line (70).

6. Working tool according to claim 4, wherein the web portion (23) has a reduced thickness on said first side of the web portion in the region between any pair of adjacent guide grooves.

7. Working tool according to claim 4, wherein an annular recess (53') is provided on said first side of the web portion, said annular recess bordering the outer periphery of the outer guide groove (22') and having a flat bottom.

8. Working tool according to claim 4, wherein the corner between the inner wall and the bottom of the outer guide groove and the corner between the inner wall and the bottom of the inner guide groove each form an angle of approximately 90°.

9. Working tool according to claim 2, wherein the radial distance (D) between the inner wall (34, 34') of the inner guide groove (21, 21') and the inner wall (35; 35') of the outer guide groove (22, 22') corresponds to between 10 and 60% of the width (W) of said blank (3; 3').

10. Working tool according to claim 9, wherein said radial distance (D) corresponds to between 15 and 50% of the width (W) of the blank.

11. Working tool according to claim 10, wherein said radial distance (D) corresponds to between 20 and 40% of the width (W) of the blank.

12. Working tool according to claim 10 or 1, wherein the number of guide grooves is two.

13. Working tool according to claim 9, wherein the radial distance (D) corresponds to between 20 and 60% of the width of the blank, the number of guide grooves being three.

14. Working tool according to claim 1, wherein the guide grooves (21,22;21',22') have a depth (t), which is more than 25% and less than 75% of the thickness (T) of the web portion (23), where depth and thickness are measured from the first side (24).

15. Working tool according to claim 14, wherein said depth (t) is more than 30% and less than 70% of the thickness (T) of the web portion.

16. Working tool according to claim 1, wherein the radial distance (d) between the inner wall (34;34') of the inner guide groove (21;21') and the inner edge (19) is bigger than 5% and smaller than 50%, and preferably bigger than 5% and smaller than 30% of the width (W) of the blank.

17. Working tool according to claim 1, wherein the width (W) of the blank corresponds to between 8 and 30% of the radius of the outer edge (31) of the blank.

18. Working tool according to claim 17, wherein the width of the blank corresponds to between 10 and 25% of the outer radius of the blank.

19. Working tool according to claim 1, wherein the guide grooves (21, 22) are substantially equally deep.

20. Tool assembly comprising a working tool according to claim 1.

21. Tool assembly according to claim 20 further comprising at least two guide rollers (5, 5') being provided each with at least one cylindrical rolling and clamping surface (57, 58, 59; 57', 59') and at least one circumferential guide flange (25, 26) that either engages in, or is designed or intended to be engaged with a corresponding guide groove (21,22; 21', 22') in the blade, the guide rollers are provided to rotate about respective axes of rotation being parallel with a centre plane (45) of the annular blade.

22. Tool assembly according to claim 21, wherein the guide rollers (5, 5') are either pressed or are intended to be pressed in a direction parallel with a centre plane (45) of the blade (2) so that the guide flanges are pressed against the inner wall (34, 35; 34', 35') in order to keep the rotational axis of the blade at a predetermined position.

23. Tool assembly according to claim 22, wherein the number of guide grooves in the blade is larger than the number of guide flanges of at least one and preferably all of the guide rollers.

24. Tool assembly according to claim 22, wherein the number of guide grooves in the blade is equal to the number of guide flanges of at least one and preferably all of the guide rollers.

25. Tool assembly according to claim 23 or 24, wherein the number of guide flanges of at least one and preferably all of the guide rollers is at least two.

26. Tool assembly according to claim 25, wherein the radial distance (D) between the inner wall (34; 34') of the inner guide groove (21; 21') of the working tool and the inner wall (35; 35') of the outer guide groove (22; 22') of the working tool is smaller than the distance (D) between two inner flanks (55,56; 55', 56') on two neighbouring guide flanges (25,26; 25',26'), such that only one inner flank will contact the corresponding inner wall in a new tool assembly such that this will change and another inner flank of a neighbouring guide flange will come into contact with another sidewall of a neighbouring guide groove only after a suitable amount of wear of the inner flank and/or inner wall in contact has taken place.

27. Tool assembly according to claim 21, wherein the width (B) of a peripheral part of the guide rollers (5) amount to at least 15%, but do not exceed 70%, of the total width (W) of the blank, wherein the preferred limits are at least 30% and not exceeding 60% of the total width (W) of the blank.

28. Tool assembly according to claim 21 further comprising at least two support rollers (6, 6').

29. Tool assembly according to, claim 21 further comprising at least one driving member, in particular a drive-wheel, provided with a circumferential wedge-shaped groove (17), that is engaging, or intended to engage, or designed to engage or co-operate with the inner edge portion (18) of the blade in order to frictionally drive the blade (2) for rotation about the rotational axis.

* * * * *

UNITED STATES PATENT AND TRADEMARK OFFICE
CERTIFICATE OF CORRECTION

| | | |
|---|---|---|
| PATENT NO. | : 7,740,012 B2 | Page 1 of 1 |
| APPLICATION NO. | : 11/589552 | |
| DATED | : June 22, 2010 | |
| INVENTOR(S) | : Ove Donnerdal et al. | |

It is certified that error appears in the above-identified patent and that said Letters Patent is hereby corrected as shown below:

Column 2, line 12, please delete "riot" and insert --not--;
Column 14, line 4, please delete "1" and insert --11--;

Signed and Sealed this
First Day of March, 2011

David J. Kappos
*Director of the United States Patent and Trademark Office*